United States Patent
Han et al.

(10) Patent No.: US 10,801,427 B2
(45) Date of Patent: Oct. 13, 2020

(54) HYBRID VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Kyoungchan Han, Gunpo-si (KR); Seungeun Yu, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 50 days.

(21) Appl. No.: 16/194,128

(22) Filed: Nov. 16, 2018

(65) Prior Publication Data

US 2019/0353108 A1 Nov. 21, 2019

(30) Foreign Application Priority Data

May 16, 2018 (KR) ........................ 10-2018-0056061

(51) Int. Cl.
*F02D 41/00* (2006.01)
*F02M 26/05* (2016.01)
(Continued)

(52) U.S. Cl.
CPC ........ *F02D 41/0007* (2013.01); *F02B 37/183* (2013.01); *F02M 26/05* (2016.02);
(Continued)

(58) Field of Classification Search
CPC .... F02D 41/0007; F02B 37/013; F02B 39/10; F02B 37/183; F02M 26/05; F02M 26/06;
(Continued)

(56) References Cited

U.S. PATENT DOCUMENTS

| 7,213,396 B2 * | 5/2007 | Ries-Mueller | .......... F02B 39/10 60/285 |
| 7,451,597 B2 * | 11/2008 | Kojima | ................... F02B 39/10 60/612 |

(Continued)

FOREIGN PATENT DOCUMENTS

| DE | 102017200796 A1 * | 7/2018 | ............... F02B 39/10 |
| FR | 3058471 A1 * | 5/2018 | ............... F02B 39/10 |
| WO | WO-2016164168 A1 * | 10/2016 | ............... F02B 39/10 |

*Primary Examiner* — Thai B Trieu
(74) *Attorney, Agent, or Firm* — Morgan, Lewis & Bockius LLP (57) ABSTRACT

A hybrid vehicle may include an engine; a turbocharger including a turbine disposed in an exhaust line and a compressor; an electric supercharger disposed in the intake line at an upstream portion of the compressor; an exhaust gas post processing apparatus; a low pressure EGR device which includes a low pressure EGR line, a low pressure EGR cooler and a low pressure EGR valve; an intake bypass line which connects the intake line at a downstream portion of the electric supercharger and the intake line at an upstream portion of the electric supercharger; an intake bypass valve disposed in the intake bypass line; a post processing bypass line which connects the intake line between the electric supercharger and the compressor and the exhaust line between the turbine and the exhaust gas post processing apparatus; and a post processing bypass valve disposed in the post processing bypass line.

9 Claims, 5 Drawing Sheets

(51) Int. Cl.
| | |
|---|---|
| *F02M 26/06* | (2016.01) |
| *F02M 26/26* | (2016.01) |
| *F02B 37/18* | (2006.01) |
| *F02B 39/10* | (2006.01) |
| *B60W 10/04* | (2006.01) |

(52) U.S. Cl.
CPC ............ *F02M 26/06* (2016.02); *F02M 26/26* (2016.02); *B60W 10/04* (2013.01)

(58) Field of Classification Search
CPC ........ F02M 26/26; B60W 10/04; F01N 3/225; F01N 3/30; F01N 2900/1804
USPC ........................ 60/605.2, 612, 280, 289, 608
See application file for complete search history.

(56) References Cited

U.S. PATENT DOCUMENTS

| | | | |
|---|---|---|---|
| 2005/0000215 A1* | 1/2005 | Baeuerle | F02B 39/10 60/608 |
| 2005/0000217 A1* | 1/2005 | Nau | F02B 39/10 60/612 |
| 2016/0326972 A1* | 11/2016 | Kim | F02D 41/0007 |
| 2017/0218834 A1* | 8/2017 | Kemmerling | F02B 39/10 |
| 2017/0226938 A1* | 8/2017 | Kemmerling | F02D 41/0007 |
| 2018/0058289 A1* | 3/2018 | Lee | F02D 41/0007 |
| 2019/0242316 A1* | 8/2019 | Dudar | F01N 3/2013 |
| 2019/0309678 A1* | 10/2019 | Oh | F02B 39/10 |
| 2019/0316551 A1* | 10/2019 | Oh | F02B 39/10 |
| 2020/0109675 A1* | 4/2020 | Han | F02D 41/0007 |

\* cited by examiner

HYBRID VEHICLE AND METHOD FOR CONTROLLING THE SAME

CROSS-REFERENCE TO RELATED APPLICATION

This application claims priority to and the benefit of Korean Patent Application No. 10-2018-0056061 filed in the Korean Intellectual Property Office on May 16, 2018, the entire contents of which are incorporated herein by reference.

BACKGROUND

(a) Field

The present disclosure relates to a hybrid vehicle and a method for controlling the same.

(b) Description of the Related Art

Generally, hybrid vehicles are recognized as eco-friendly vehicles. In hybrid vehicles, an electric motor in addition to an existing internal combustion engine is provided, or a combination of two or more driving sources such as a combination of an internal combustion engine and a fuel cell is provided. In hybrid vehicles, there are many improved factors in terms of fuel efficiency and performance as compared with existing internal combustion engine vehicles.

Recently, environmental regulations on noxious materials in exhaust gases from vehicles have been increasingly enhanced in many countries. Accordingly, vehicles are equipped with various types of catalyst devices for removing noxious materials such as NOx, CO, and THC contained in exhaust gases under those regulations on exhaust gases.

As examples of the various types of catalyst devices, a diesel oxidation catalyst (DOC), a diesel particulate filter (DPF), a lean NOx trap (LNT), and a selective catalytic reduction unit (SCR) are used. Even in the hybrid vehicle, a catalyst is used in order to reduce the exhaust gas of the engine.

The above information disclosed in this Background section is only for enhancement of understanding of the background of the invention and therefore it may contain information that does not form the prior art that is already known in this country to a person of ordinary skill in the art.

SUMMARY

One aspect of the present invention provides a hybrid vehicle and a method using the same that can quickly increase a catalyst temperature of an exhaust gas post processing apparatus.

A hybrid vehicle according to an embodiment of the present invention may include an engine including a plurality of cylinder for generating driving power by burning fuel; a turbocharger including a turbine disposed in an exhaust line through which exhaust gas discharged from the cylinder flows and rotated by the exhaust gas, and a compressor which rotates in conjunction with the turbine and compresses intake gas to be supplied into the cylinder; an electric supercharger disposed in the intake line at an upstream portion of the compressor; an exhaust gas post processing apparatus which is disposed in the exhaust line at a downstream portion of the turbine and includes a catalyst; a low pressure exhaust gas recirculation (EGR) device which includes a low pressure EGR line branching off from the exhaust line at a downstream portion of the exhaust gas post processing apparatus and merging into the intake line at an upstream portion of the compressor, a low pressure EGR cooler disposed in the low pressure EGR line, and a low pressure EGR valve disposed in the low pressure EGR line; an intake bypass line which connects the intake line at a downstream portion of the electric supercharger and the intake line at an upstream portion of the electric supercharger; an intake bypass valve disposed in the intake bypass line; a post processing bypass line which connects the intake line between the electric supercharger and the compressor and the exhaust line between the turbine and the exhaust gas post processing apparatus; and a post processing bypass valve disposed in the post processing bypass line.

An electric catalyst heater may be disposed in the exhaust gas post processing apparatus.

The hybrid vehicle according to an embodiment of the present invention may further include a high pressure EGR device including a high pressure EGR line which is branched off from the exhaust line at an upstream portion of the turbine and merged into the intake line at a downstream portion of the compressor; a high pressure EGR cooler disposed in the high pressure EGR line; and a high pressure EGR valve disposed in the high pressure EGR line.

The hybrid vehicle according to an embodiment of the present invention may further include a controller for controlling an operation of the engine, the electric supercharger, the low pressure EGR valve, the intake bypass valve, the post processing bypass valve, the electric catalyst heater and the high pressure EGR valve based on an exhaust gas circulation condition.

The exhaust gas circulation condition may be satisfied when the engine is stopped during the vehicle is travelling, a temperature of the exhaust gas post processing apparatus is a predetermined temperature or less, and an SOC (stage of charge) of a battery is a predetermined value or more.

When the exhaust gas circulation condition is satisfied, the controller may control the electric supercharger to be operated, the intake bypass valve to be closed, the high pressure EGR valve to be closed, the post processing bypass valve to be opened, the electric catalyst heater to be operated, and the low pressure EGR valve to be opened.

A method for controlling a hybrid vehicle according to another embodiment of the present invention including an engine including a plurality of a cylinder, an low pressure EGR device which recirculates some exhaust gas discharged from the engine, an electric supercharger for supplying compressed air to the cylinder of the engine, a turbocharger which is operated by the exhaust gas discharged from the engine and compresses intake air supplied to the engine, a high pressure EGR device which recirculates some exhaust gas discharged from the engine, and a exhaust gas post processing apparatus which includes a catalyst for purifying the exhaust gas discharged from the engine, the method may include determining whether an exhaust gas circulation condition is satisfied by a controller; and controlling an operation of the electric supercharger, a low pressure EGR valve of the low pressure EGR device, an intake bypass valve disposed in an intake bypass line bypassing the electric supercharger disposed in a intake line, a post processing bypass valve disposed in a post processing bypass line which is branched off from the intake line between the electric supercharger and a compressor of the turbocharger and merged into the exhaust line at an upstream portion of the exhaust gas post processing apparatus, an electric catalyst heater of the exhaust gas post processing apparatus, and a high pressure EGR valve of the high pressure EGR device based on the exhaust gas circulation condition by the controller.

The exhaust gas circulation condition may be satisfied when the engine is stopped during the vehicle is travelling, a temperature of the exhaust gas post processing apparatus is a predetermined temperature or less, and an SOC (stage of charge) of a battery is a predetermined value or more.

When the exhaust gas circulation condition is satisfied, the electric supercharger may be operated, the intake bypass valve may be closed, the high pressure EGR valve may be closed, the post processing bypass valve may be opened, the electric catalyst heater may be operated, and the low pressure EGR valve may be opened.

According to an embodiment of the present invention, since heated air is circulated through a circulation loop when the engine is temporarily stopped during travelling of the vehicle, a catalyst temperature is kept close to an activation temperature. Therefore, the catalyst temperature quickly approaches to the activation temperature when the engine is restarted, and thus the purification efficiency of exhaust gas by the catalyst is improved.

BRIEF DESCRIPTION OF THE DRAWINGS

The attached drawings illustrate embodiments of the present invention, provided for describing the present invention in more detail, but not for limiting technical aspects of the present invention.

DETAILED DESCRIPTION OF THE EMBODIMENTS

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive, like reference numerals designate like elements throughout the specification.

Further, since sizes and thicknesses of elements are shown at will for convenience of description, the present invention is not always limited to the drawings, and the thicknesses are enlarged for clearly expressing different parts and regions.

In hybrid vehicles, a catalyst is used in order to reduce the exhaust gas of the engine, but since an activated temperature of the catalyst is significantly higher than room temperature, the catalyst temperature is increased by driving the engine and thus the catalyst is activated. An exhaust gas post-processing system, such as the DOC, the LNT, and the SCR, mounted for reducing noxious materials needs a basic temperature (activation temperature) for chemical reaction.

In an EV (electric vehicle) mode that the hybrid vehicle travels by only driving torque of an electric motor, exhaust gas is not generated or exhausted. And when the engine is repeatedly stopped by an ISG (idle stop & go) function, amount of exhaust gas is very small.

In this case, catalyst temperature of an exhaust gas post processing apparatus is gradually decreased. Thereafter, when the engine is operated, and amount of exhaust gas discharged from the engine is increased, the exhaust gas post processing apparatus is not quickly activated and thus a purification rate of exhaust gas by the exhaust gas post processing apparatus and an amount of exhaust gas, such as nitrogen oxide, is increased.

Hereinafter, a hybrid vehicle according to an embodiment of the present invention will be described in detail with reference to the accompanying drawings.

Figure 1:
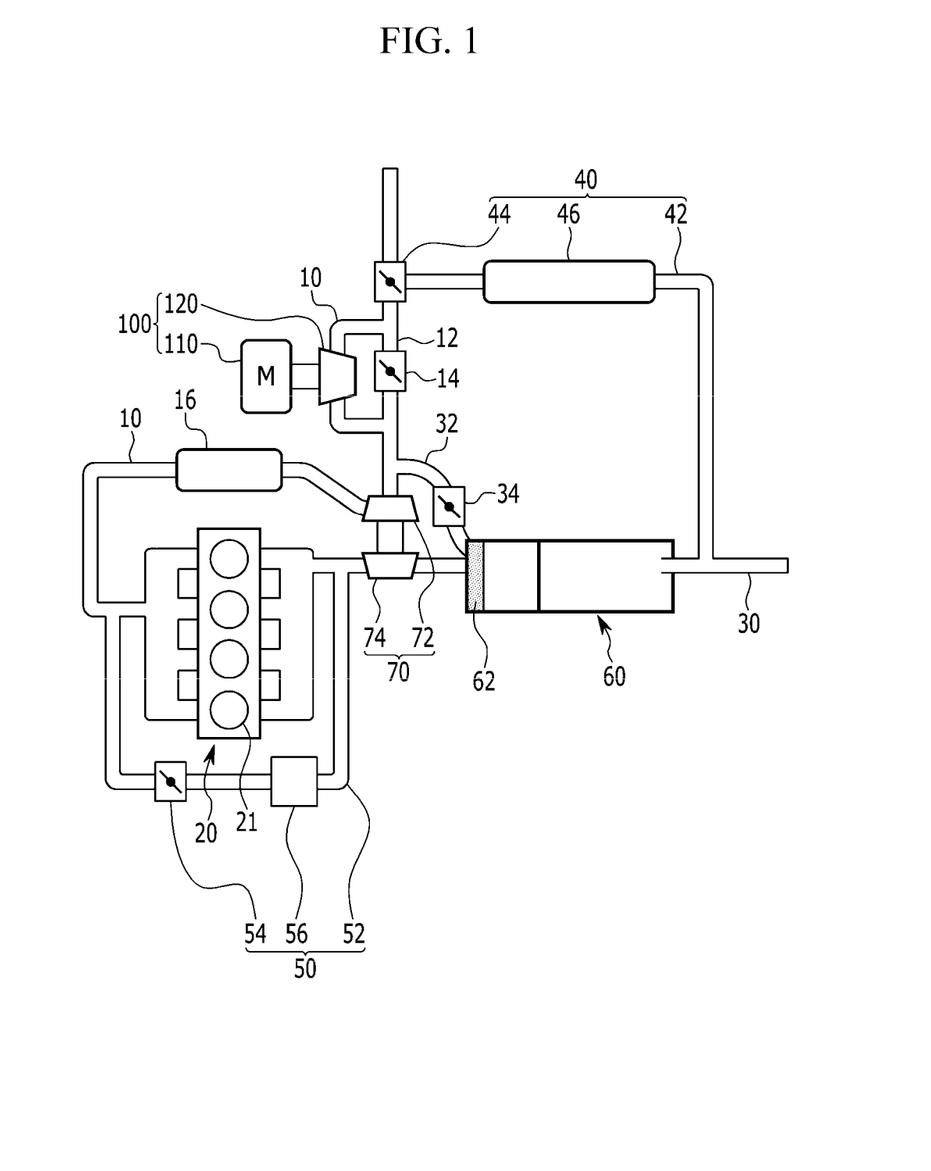
FIG. 1 is a schematic view illustrating a hybrid vehicle according to an embodiment of the present invention.

FIG. 1 is a schematic view illustrating a hybrid vehicle according to an embodiment of the present invention. And FIG. 2 is a block diagram illustrating a hybrid vehicle according to an embodiment of the present invention.

Figure 2:
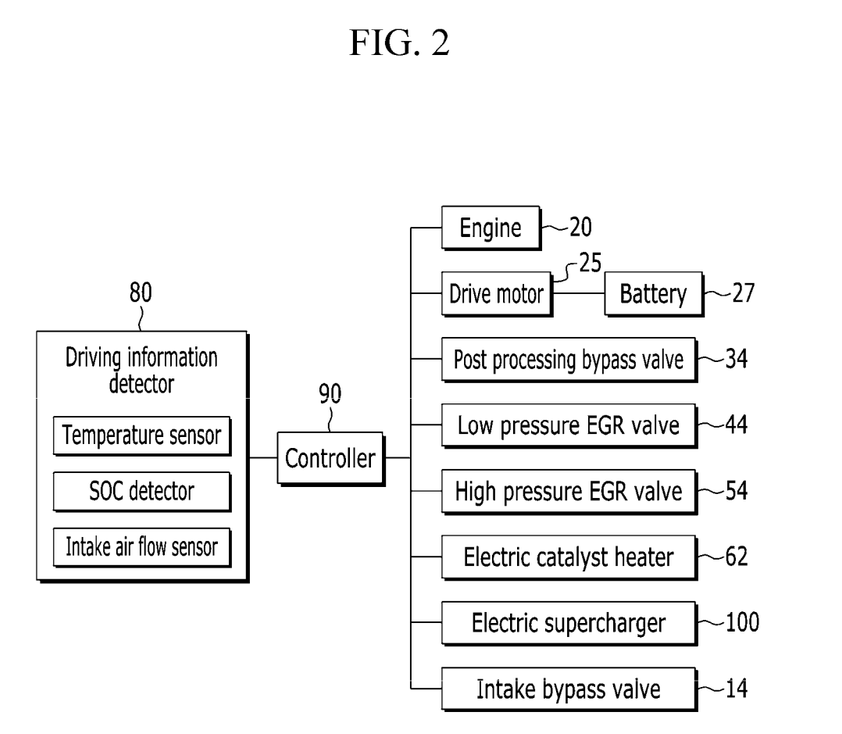
FIG. 2 is a block diagram illustrating a hybrid vehicle according to an embodiment of the present invention.

As shown in FIG. 1 and FIG. 2, in embodiments, a hybrid vehicle according to an embodiment of the present invention may include an engine 20, a drive motor 25, a turbocharger 70, an electric supercharger 100, an exhaust gas post processing apparatus 60, a low pressure EGR device 40 and a high pressure EGR device 50.

In embodiments, the internal combustion engine 20 includes a plurality of cylinder 21 generating driving torque by burning fuel. The engine 20 has an intake line 10 in which an intake gas that is supplied to the cylinder 21 flows and an exhaust line 30 in which an exhaust gas that is discharged from the cylinder 21 flows.

In embodiments, the drive motor 25 receives power from a battery 27 and supports driving torque of the engine 20. The drive motor 25 generates electric power by operating selectively as a power generator, and the electric power is charged in the battery 27.

In embodiments, the exhaust gas post processing apparatus 60 including a catalyst which purifies various toxic material included in exhaust gas discharged from the cylinder 21 is disposed in the exhaust line 30. The exhaust gas post processing apparatus 60 may include an LNT (lean NOx trap), a diesel oxidation catalyst (DOC) and a diesel particulate filter (DPF). An electric catalyst heater 62 is disposed in the exhaust gas post processing apparatus 60. The electric catalyst heater 62 heats the exhaust gas post processing apparatus 60 as necessary.

The electric supercharger 100 is dispose in the intake line 10, supplies compressed air to the cylinder 21, and includes a motor 110 and an electric compressor 120. The electric compressor 120 is operated by the motor 110, and compresses external air depending on a driving condition to be supplied to the cylinder.

In embodiments, an intake bypass line 12 which bypasses the electric supercharger 100 is provided in the intake line 10. The intake bypass line 12 is branched off from the intake line 10 at an upstream portion of the electric supercharger 100 and merged into the intake line 10 at a downstream portion of the electric supercharger 100. An intake bypass valve 14 is disposed in the intake bypass line 12, and air amount bypassing the electric supercharger 100 is adjusted by opening degree of the intake bypass valve 14.

The turbocharger 70 compresses intake gas (external air+recirculation exhaust gas) inflowing through the intake line 10 and supplies the intake gas to the cylinder 21. The turbocharger 70 includes turbine 74 which is disposed in the exhaust line 30 and rotates by exhaust gas discharged from the cylinder 21, and a compressor 72 which is disposed in the intake line 10, rotates in conjunction with the turbine 74 and compresses the intake gas.

In embodiments, the low pressure EGR device 40 (LP-EGR) includes a low pressure EGR line 42, a low pressure EGR cooler 46 and a low pressure EGR valve 44. The low pressure EGR line 42 is branched off from the exhaust line 30 at a downstream portion of the turbocharger 70 and merged into the intake line 10 an upstream portion of the compressor 72. The low pressure EGR cooler 46 is disposed in the low pressure EGR line 42 and cools exhaust gas flowing through the low pressure EGR line 42. The low pressure EGR valve 44 is disposed at a point which the low pressure EGR line 42 and the intake line 10 are joined with each other, and adjusts exhaust gas amount flowing through the intake line 10.

The high pressure EGR device 50 (HP-EGR device) includes a high pressure EGR line 52 which is branched off from the exhaust line 30 at an upstream portion of the turbine 74 and merged into a downstream portion of the intake line 10, a high pressure EGR cooler 56 disposed in the high pressure EGR line 52 and a high pressure EGR valve 54 which is disposed in the high pressure EGR line 52 and adjusts exhaust gas amount that is recirculated to the intake line.

In embodiments, an intercooler 16 is disposed in the intake line 10 at a downstream portion of the compressor 72. The intercooler 16 cools intake gas, which is introduced through the intake line 10, through a heat exchange with a coolant. In embodiments, because the intake gas compressed by the turbocharger 70 expands as a temperature thereof increases, oxygen density of the intake gas supplied into the cylinder 21 decreases, and for this reason, it is difficult to output torque required for the engine 20. Therefore, the density of the intake gas is increased by cooling the intake gas by the intercooler 16, thereby improving combustion efficiency of the engine 20.

Meanwhile, the hybrid vehicle according to an embodiment of the present invention may further include a post processing bypass line 32 which connects the intake line 10 and the exhaust line 30. The post processing bypass line 32 is branched off from the intake line 10 between the electric supercharger 100 and the compressor 72, and merged into the exhaust line 30 between the turbine 74 and the exhaust gas post processing apparatus 60. In embodiments, the line 32 may be directly connected to the apparatus 60. A post processing bypass valve 34 is disposed in the post processing bypass line 32.

The hybrid vehicle according to an embodiment of the present invention may further include one or more controllers 90 for controlling an operation of the engine 20, the electric supercharger 100, the low pressure EGR valve 44, the intake bypass valve 14, the post processing bypass valve 34, the electric catalyst heater 62 and the high pressure EGR valve 54 based on an exhaust gas circulation condition.

The controller 90 determines whether the exhaust gas circulation condition is satisfied based on a driving information detected by a driving information detector 80.

For example, the exhaust gas circulation condition may be satisfied when the engine 20 is stopped during the vehicle is travelling (in other word, intake air is not supplied to the cylinder 21, a temperature of the exhaust gas post processing apparatus 60 is a predetermined temperature or less, and an SOC (stage of charge) of the battery 27 is a predetermined value or more.

In embodiments, the exhaust gas circulation condition may be satisfied when a drive mode of the vehicle is an EV (electric vehicle) mode which the vehicle travels by only driving torque of the drive motor 25, or the engine 20 is temporally stopped by an ISG (idle stop and go) function during travelling.

The driving information detector 80 may include a temperature sensor for detecting the temperature of the exhaust gas post processing apparatus 60, an SOC detector for detecting SOC of the battery 27 and an intake air flow sensor for detecting intake air amount supplied to the cylinder 21. The driving information detected by the driving information detector 80 is transmitted to the controller 90.

The controller 90 can be realized by one or more processors activated by a predetermined program, and the predetermined program can be programmed to perform each step of a method for controlling the hybrid vehicle according an embodiment of this invention Hereinafter, a method for controlling the hybrid vehicle according to an embodiment of the present invention will be described in detail with reference to accompanying drawings.

Figure 3:
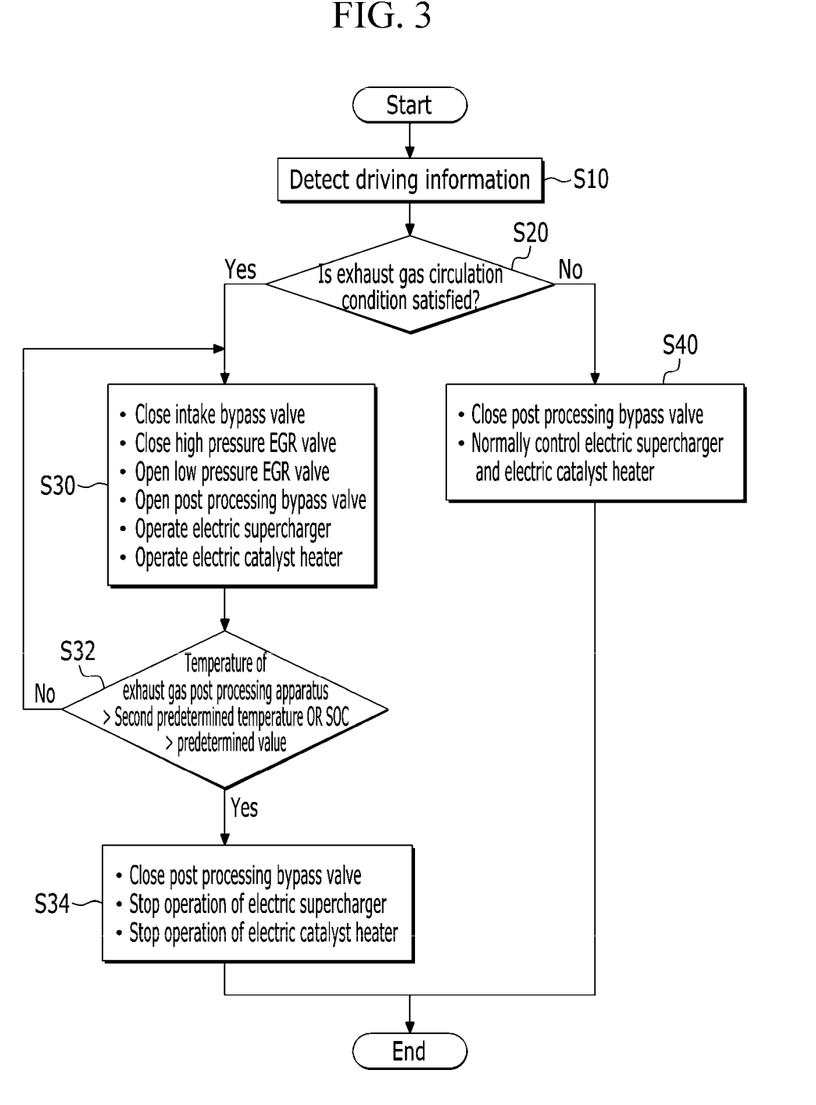
FIG. 3 is a flowchart illustrating a method for controlling a hybrid vehicle according to an embodiment of the present invention.

FIG. 3 is a flowchart illustrating a method for controlling a hybrid vehicle according to an embodiment of the present invention.

Referring to FIG. 3, when the vehicle starts to travel, the driving information detector 80 detects the driving information of the vehicle at step S10.

The controller 90 determines whether the exhaust gas circulation condition is satisfied based on the driving information detected by the driving information detector 80 at step S20. The exhaust gas circulation condition is the same as the above-described, and hence no detailed description will be provided.

When the exhaust gas circulation condition is satisfied, the controller 90 controls the intake bypass valve 14 to be closed, the high pressure EGR valve 54 to be closed, the post processing bypass valve 34 to be opened, and the low pressure EGR valve 44 to be opened at step S30. When the valves are controlled as described above, the intake line 10, the post processing bypass line 32 and the low pressure EGR line 42 may form a circulation loop which air circulates (refer to FIG. 4).

Figure 4:
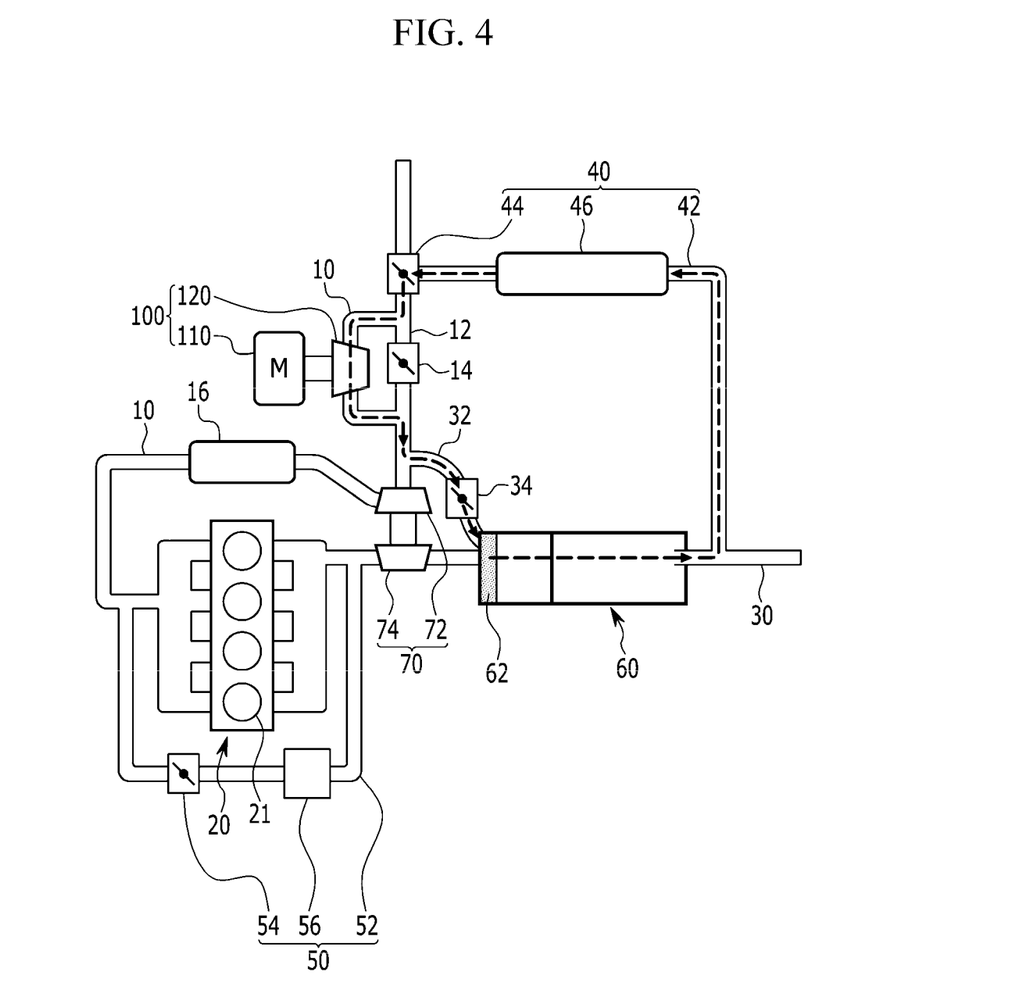
FIG. 4 is a drawing when an engine of a hybrid vehicle according to an embodiment of the present invention is stopped.

And when the controller 90 operates the electric supercharger 100, air circulates through the circulation loop. In embodiments, the electric supercharger 100 performs as a kind of a pump. And when the controller 90 operates the electric catalyst heater 62 of the exhaust gas post processing apparatus 60, the air circulating the circulation loop is heated and the catalyst temperature of the exhaust gas post processing apparatus 60 is increased.

As such, when the engine 20 is temporally stopped during the vehicle is travelling, the catalyst temperature is kept to be close to an activation temperature by heated air circulating through the circulation loop. Accordingly, when the engine 20 is restarted, the catalyst temperature is quickly increased to the activation temperature, and a purification efficiency of exhaust gas by the exhaust gas post processing apparatus 60 is improved.

After the step S30, the controller 90 continuously detects the temperature of the exhaust gas post processing apparatus 60 and SOC of the battery 27. When the temperature of the exhaust gas post processing apparatus 60 is a second predetermined temperature or more, or the SOC of the battery 27 is a second predetermined value or less at step S32, the controller 90 controls the post processing bypass valve 34 to be closed, and the electric supercharger 100 and the electric catalyst heater 62 to be stopped at step S34.

Figure 5:
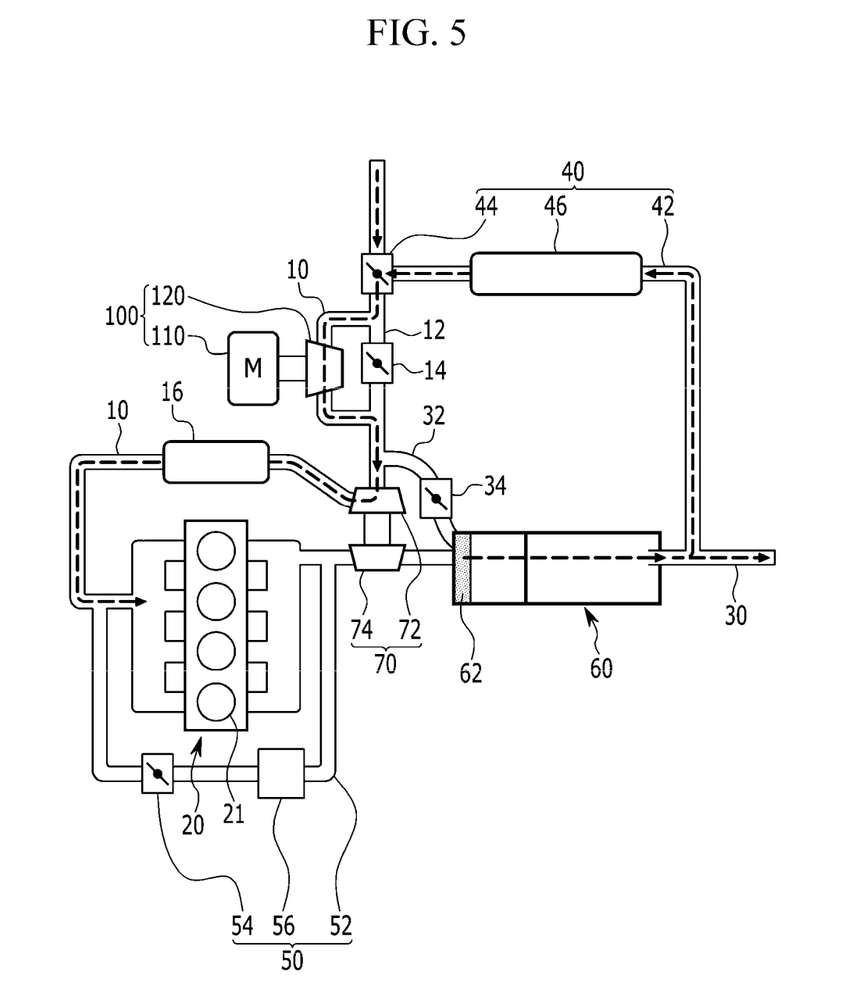
FIG. 5 a drawing when an engine of a hybrid vehicle according to an embodiment of the present invention is normally operated.

In the step S20, when the exhaust gas circulation condition is not satisfied, the controller 90 controls the post processing bypass valve 34 to be closed, and controls an operation of the electric supercharger 100, opening degree of the intake bypass valve 14, the low pressure EGR valve 44 and the high pressure EGR valve 54 based on an operation region of the engine 20 at step S40. In embodiments, when the exhaust gas circulation condition is not satisfied, air is not circulated through the circulation loop, and the hybrid vehicle is operated based on a general operation region of the engine 20 (refer to FIG. 5).

As described above, according to an embodiment of the present invention, heated air is circulated through the circulation loop when the engine 20 is temporally stopped during the vehicle is travelling, exhaust gas is not discharged, and the catalyst temperature of the exhaust gas post processing apparatus 60 is decreased. Accordingly, since the catalyst temperature is kept to close to the activation temperature, the catalyst temperature quickly reaches the activation temperature when the engine 20 is restarted, and thus the purification efficiency of exhaust gas by the catalyst can be improved.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: intake line
12: intake bypass line
14: intake bypass valve
16: intercooler
20: engine
21: cylinder
25: drive motor
27: battery
30: exhaust line
32: post processing bypass line
34: post processing bypass valve
40: low pressure EGR device
42: low pressure EGR line
44: low pressure EGR valve
46: low pressure EGR cooler
50: high pressure EGR device
52: high pressure EGR line
54: high pressure EGR valve
56: high pressure EGR cooler
60: exhaust gas post processing apparatus
62: electric catalyst heater
70: turbocharger
72: compressor
74: turbine
80: driving information detector
90: controller
100: electric supercharger
110: motor
120: electric compressor While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A hybrid vehicle comprising:
   an engine including a cylinder and configured to generate driving power by burning fuel;
   a turbocharger including a turbine disposed in an exhaust line through which exhaust gas discharged from the cylinder flows and rotated by the exhaust gas, and a compressor configured to rotate in conjunction with the turbine and compress intake gas to be supplied into the cylinder;
   an electric supercharger disposed in the intake line at an upstream portion of the compressor;
   an exhaust gas post processing apparatus which is disposed in the exhaust line at a downstream portion of the turbine and includes a catalyst;
   a low pressure exhaust gas recirculation (EGR) device which includes a low pressure EGR line branching off from the exhaust line at a downstream portion of the exhaust gas post processing apparatus and merging into the intake line at an upstream portion of the compressor, a low pressure EGR cooler disposed in the low pressure EGR line, and a low pressure EGR valve disposed in the low pressure EGR line;
   an intake bypass line which connects a first intake line portion of the intake line located at a downstream portion of the electric supercharger and a second intake line portion of the intake line located at an upstream portion of the electric supercharger;
   an intake bypass valve disposed in the intake bypass line;
   a post processing bypass line which connects a third intake line portion of the intake line located between the electric supercharger and the compressor and a first exhaust line portion of the exhaust line located between the turbine and the exhaust gas post processing apparatus;
   a post processing bypass valve disposed in the post processing bypass line; and
   a driving information detector comprising a temperature sensor configured to detect a temperature of the exhaust gas post processing apparatus a stage of charge (SOC) detector configured to detect a state of charge of a battery, and an intake air flow sensor configured to detect intake air amount supplied to the cylinder.

2. The hybrid vehicle of claim 1, wherein an electric catalyst heater is disposed in the exhaust gas post processing apparatus.

3. The hybrid vehicle of claim 2, further comprising:
   a high pressure EGR device including a high pressure EGR line which is branched off from the exhaust line at an upstream portion of the turbine and merged into the intake line at a downstream portion of the compressor;

a high pressure EGR cooler disposed in the high pressure EGR line; and a high pressure EGR valve disposed in the high pressure EGR line.

4. The hybrid vehicle of claim 3, further comprising:

a controller operatively coupled to the driving information detector and configured to control an operation of the engine, the electric supercharger, the low pressure EGR valve, the intake bypass valve, the post processing bypass valve, the electric catalyst heater and the high pressure EGR valve based on an exhaust gas circulation condition.

5. The hybrid vehicle of claim 4, wherein the exhaust gas circulation condition is satisfied, when the engine is stopped during the vehicle is travelling, a temperature of the exhaust gas post processing apparatus is a predetermined temperature or less, and the SOC of the battery is a predetermined value or more.

6. The hybrid vehicle of claim 5, wherein when the exhaust gas circulation condition is satisfied, the controller is configured to control the electric supercharger to be operated, the intake bypass valve to be closed, the high pressure EGR valve to be closed, the post processing bypass valve to be opened, the electric catalyst heater to be operated, and the low pressure EGR valve to be opened.

7. A method of controlling a hybrid vehicle including an engine including a cylinder, an low pressure EGR device which recirculates a portion of exhaust gas discharged from the engine, an electric supercharger for supplying compressed air to the cylinder of the engine, a turbocharger which is operated by the exhaust gas discharged from the engine and compresses intake air supplied to the engine, a high pressure EGR device which recirculates a portion of exhaust gas discharged from the engine, an exhaust gas post processing apparatus which includes a catalyst for purifying the exhaust gas discharged from the engine, and a driving information detector for detecting temperature of the exhaust gas post processing apparatus, a stage of charge (SOC) of a battery and intake air amount supplied to the cylinder, the method comprising:

by a controller operatively coupled to the driving information detector, determining whether an exhaust gas circulation condition is satisfied; and by the controller, controlling an operation of the electric supercharger, a low pressure EGR valve of the low pressure EGR device, an intake bypass valve disposed in an intake bypass line bypassing the electric supercharger disposed in a intake line, a post processing bypass valve disposed in a post processing bypass line which is branched off from the intake line between the electric supercharger and a compressor of the turbocharger and merged into the exhaust line at an upstream portion of the exhaust gas post processing apparatus, an electric catalyst heater of the exhaust gas post processing apparatus, and a high pressure EGR valve of the high pressure EGR device based on the exhaust gas circulation condition.

8. The method of claim 7, wherein the exhaust gas circulation condition is satisfied, when the engine is stopped during the vehicle is travelling, a temperature of the exhaust gas post processing apparatus is a predetermined temperature or less, and the SOC of the battery is a predetermined value or more.

9. The method of claim 8, wherein when the exhaust gas circulation condition is satisfied, the electric supercharger is operated, the intake bypass valve is closed, the high pressure EGR valve is closed, the post processing bypass valve is opened, the electric catalyst heater is operated, and the low pressure EGR valve is opened.

* * * * *